Patented Feb. 9, 1954

2,668,842

UNITED STATES PATENT OFFICE 2,668,842

O,O-BIS($\beta,\beta,\beta$-TRICHLOROTERTIARYBUTYL) METHANEPHOSPHONATE

Henry Tolkmith, Midland, Mich., assignor to The Dow Chemical Company, Midland, Mich., a corporation of Delaware No Drawing. Application April 21, 1953, Serial No. 350,226

1 Claim. (Cl. 260—461)

The present invention is directed to O,O-bis-($\beta,\beta,\beta$-trichlorotertiarybutyl) methanephosphonate of the formula

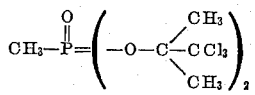

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting two molecular proportions of $\beta,\beta,\beta$-trichlorotertiarybutanol with one molecular proportion of methanephosphonic dichloride of the formula

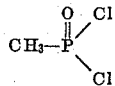

in an inert organic solvent such as diethyl ether or benzene. The reaction is carried out in the presence of a hydrogen chloride acceptor such as pyridine.

In carrying out the reaction, the $\beta,\beta,\beta$-trichlorotertiarybutanol and pyridine are dispersed in the solvent and the resulting mixture added portionwise with stirring to the methanephosphonic dichloride dispersed in the same solvent. The mixture is thereafter heated for a period of time at a temperature of from 30° to 80° C. to complete the reaction. The reaction takes place smoothly at the temperature range of from 20° to 80° C., and at a rate which varies directly with the employed temperature. The reaction is somewhat exothermic, the temperature being controlled by regulation of the rate of contacting the reactants as well as by the addition or subtraction of heat, if required. Upon completion of the reaction, the mixture may be filtered and the filtrate distilled under reduced pressure at gradually increasing temperatures to separate low boiling constituents and to obtain as a residue the desired O,O-bis-($\beta,\beta,\beta$-trichlorotertiarybutyl) methanephosphonate. Distillation temperatures substantially in excess of 160° C. for any appreciable period of time should not be employed as the desired product has a tendency to decompose at such temperature.

In a representative preparation, 55 grams (0.31 mole) of $\beta,\beta,\beta$-trichlorotertiarybutanol and 27 grams (0.34 mole) of pyridine were dispersed in 500 milliliters of diethyl ether and the resulting mixture added portionwise with stirring to 20 grams (0.15 mole) of methanephosphonic dichloride (having a boiling point of 163° C. at atmospheric pressure) dispersed in 200 milliliters of diethyl ether. The resulting mixture was thereafter heated for 3 hours at the boiling temperature and under reflux to complete the reaction. At the end of this period, the mixture was filtered and the filtrate concentrated by distillation to a temperature up to 80° C. to obtain as a residue O,O-bis-($\beta,\beta,\beta$-trichlorotertiarybutyl) methanephosphonate. The latter is a viscous oil having a refractive index $n/D$ of 1.5543 at 20° C.

The new O,O-bis-($\beta,\beta,\beta$-trichlorotertiarybutyl) methanephosphonate has been tested and found to be effective as a parasiticide and is adapted to be employed for the control of a wide range of agricultural and household pests such as flies, mites, aphids, beetles and cockroaches. For such use, the compound may be dispersed on an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

This is a continuation in part of my copending application Serial No. 203,753, filed December 30, 1950.

I claim:

O,O - bis - ($\beta,\beta,\beta$ - trichlorotertiarybutyl) methanephosphonate.

HENRY TOLKMITH.

No references cited.